(12) United States Patent
Kaikuranta

(10) Patent No.: US 6,373,046 B2
(45) Date of Patent: *Apr. 16, 2002

(54) SMALL SIZED OPTICAL TRANSMISSION UNIT SUITABLE FOR NON-SIMULTANEOUS TRANSMISSION AND RECEPTION

(75) Inventor: Terho Kaikuranta, Piispanristi (FI)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/169,642

(22) Filed: Oct. 9, 1998

(30) Foreign Application Priority Data

Oct. 13, 1997 (FI) .................................................. 973943

(51) Int. Cl.[7] ................................................ H01L 31/00
(52) U.S. Cl. ..................................... 250/214.1; 250/216
(58) Field of Search ........................... 250/214.1, 216, 250/206; 257/79–84; 359/152, 149, 154; 370/313, 301, 302

(56) References Cited

U.S. PATENT DOCUMENTS

| 4,367,483 A | 1/1983 | Takahashi et al. ............. 357/19 |
| 4,945,633 A | 8/1990 | Hakanen et al. ............... 29/825 |
| 5,253,146 A | 10/1993 | Halttunen et al. ........... 361/784 |
| 5,335,361 A | * 8/1994 | Ghaem ......................... 257/82 |
| 5,665,525 A | 9/1997 | Pienimaa ..................... 430/315 |
| 5,699,406 A | 12/1997 | Liikanen et al. ............... 379/58 |
| 5,732,101 A | * 3/1998 | Shin ............................ 257/82 |

FOREIGN PATENT DOCUMENTS

WO    WO 97/04491    2/1997

OTHER PUBLICATIONS

Patent Abstracts of Japan JP 7168061 A, Jul. 95.

* cited by examiner

Primary Examiner—Que T. Le
(74) Attorney, Agent, or Firm—Perman & Green, LLP

(57) ABSTRACT

A small sized optical transmission unit suitable for non-simultaneous transmission and reception comprising a transmitter and a receiver operating in the optical wavelenght range is described. The optical unit includes an optical element. Furthermore, both the transmitter and the receiver are arranged to utilize the same optical element. In addition, the transmitter is positioned between the receiver and the optical element."

11 Claims, 4 Drawing Sheets

SMALL SIZED OPTICAL TRANSMISSION UNIT SUITABLE FOR NON-SIMULTANEOUS TRANSMISSION AND RECEPTION

BACKGROUND OF THE INVENTION

1. Field of the Invention

The invention relates to optical transmission, particularly to small-sized transmitter/receiver units.

2. Description of the Related Art

In many communication applications an optical transmission link, particularly an infrared link, is an advantageous way to realise a transmission link. In most cases the optical transmission link is realised with an optical transmission unit comprising a transmitter operating in the optical wavelength range and a receiver operating in the corresponding range. In this application the optical wavelength range means that range of the electromagnetic spectrum, which ranges from and comprising the ultraviolet region (UV) up to and comprising the infrared region (IR), whereby it also comprises the range of visible light.

A generally used standard in optical transmission is the so called IrDA standard, and infrared links according to this standard are used i.a. in different infrared remote control devices, in data communication between computers and printers, and generally in the data communication of small-sized portable equipment. The IrDA standard is so widely used that currently there are available very small modules realised in hybrid techniques and containing a transmitter and receiver as well as a preamplifier circuit, which are required for the infrared link. Typically a light emitting diode (LED) acts as the transmitter, and a PIN diode acts as the receiver.

The smallest prior art IrDA modules have a structure like that in the example shown in FIG. 1. In the prior art solutions the PIN diode 2, the LED 1 and the preamplifier circuit 3 are placed side by side in a row on a substrate 7, whereby the width of the module 5 will be essentially the width of this row. In prior art arrangements it is also common that the transmitter 1 or LED uses a separate lens 4 and that the receiver 2 or the PIN diode uses another separate lens 6. Further the module 5 comprises a casing 9. The transmitter 1, the receiver and the preamplifier 3 are connected with bonding wires to the conductor pattern on the substrate, whereby conductor patterns on the substrate 7 form the required electrical connections between the pins and the preamplifier circuit 3, the receiver 3 and the transmitter 1. The module pins 11 can also be a part of the substrate, or they can also form the whole substrate, whereby the signal processing circuit 3, the receiver 2 and the transmitter 1 are directly mounted on the pins 11.

There are substantial disadvantages related to the prior optical transmission modules. Even the smallest prior art optical transmission modules are often too wide and large to be used for instance in mobile communication means. Further, it is very cumbersome and expensive to acquire and install two different lenses separately for the receiver and the transmitter.

SUMMARY OF THE INVENTION

The object of the invention is to realise an optical transmission module, which is smaller than known prior art solutions.

These objects are attained by mounting the preamplifier circuit 3, the receiver 2 and the transmitter 1 at least partially on top of each other, whereby the structure occupies substantially less space in the sidewards direction than prior art solutions. In such a solution the transmitter 1 shadows the receiver, whereby the reception sensitivity decreases. However, typical LEDs are small compared to the sensitive PIN diode, so that the savings in the mounting area of the module attained by the solution according to the invention will be a greater advantage than the disadvantage due to the decreased reception sensitivity.

The optical transmission unit according to the invention is characterized by that, which is stated in the characterizing part of the independent claim directed to an optical transmission unit. The mobile station according to the invention is characterised by that, which is stated in the characterizing part of the independent claim directed to a mobile station. The dependent claims describe further advantageous embodiments of the invention.

BRIEF DESCRIPTION OF THE DRAWINGS

The invention is described in more detail below with reference to preferred embodiments presented as examples and to the enclosed drawings, in which.

DESCRIPTION OF THE PREFERRED EMBODIMENTS

Figure 1:
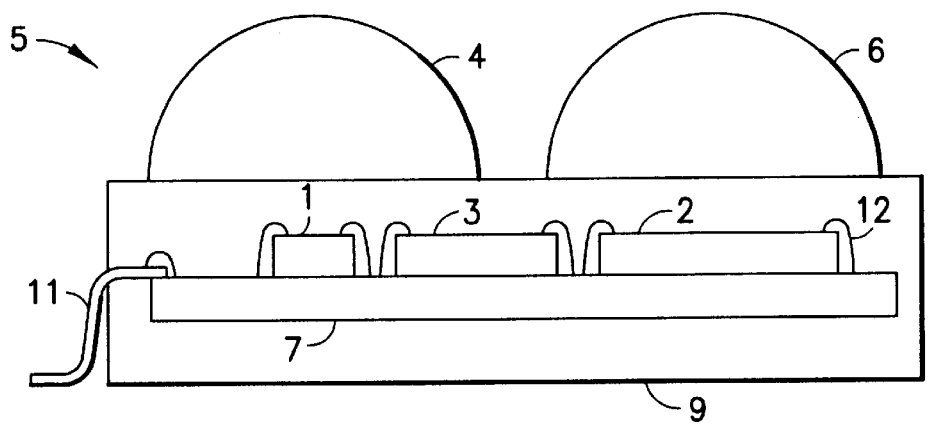
FIG. 1, which was described above in connection with the prior art description, shows an optical transmission module according to prior art.

The same reference numerals and markings are used for corresponding components in the figures.

Figure 2:
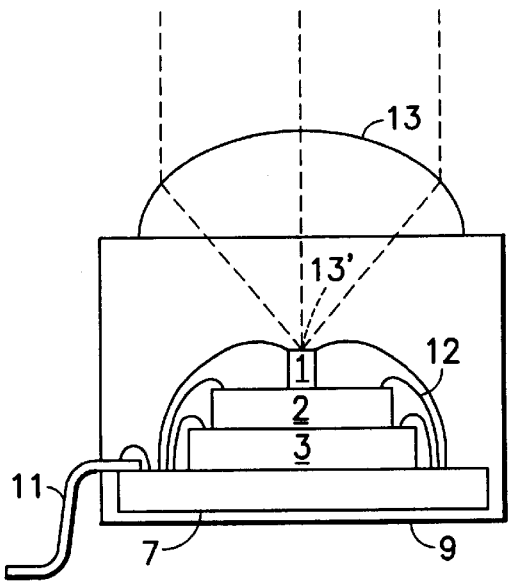
FIG. 2 shows a preferred embodiment according to the invention.

FIG. 2 shows a preferred embodiment of the invention as seen from one side. In this embodiment the transmitter 1 is located on top of the receiver 2, which in mu is placed on top of the signal processing circuit 3. The transmitter 1 is preferably in the focus 13' of the optical element 13, or in This embodiment of the lens 13. The transmitter 1 sends optical signals through the optical element 13. The optical element collects optical signals for the receiver 2. The dotted lines in FIG. 2 illustrate the path of the light rays. In this embodiment conductors are formed on the substrate 7, to which conductors the transmitter, the receiver and the signal processing circuit 3 are connected by bonding wires 12. The module pins 11 are also fixed to the substrate so that they are connected to the substrate conductor pattern by bonding wires or by some other prior art method. The pins 11 of the module can also in a prior art manner form a part of the substrate or the whole substrate, whereby the signal processing circuit 3, the receiver 2 and the transmitter 1 are fixed directly on the pins 11.

The transmitter 1 can preferably be a light emitting diode (LED). For instance a semiconductor laser or another means for sending optical signals can also be used as the transmitter.

Figure 3:
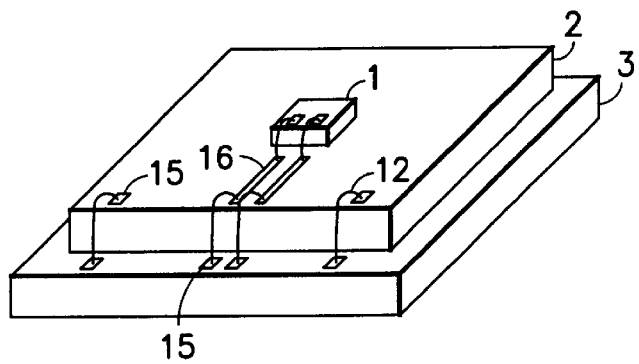
FIG. 3 shows a possible module design according to the embodiment of FIG. 2.

FIG. 3 shows a possible design used in the embodiment according to FIG. 2. For the sake of clarity FIG. 3 does not show the module's substrate, casing, pins and lens. The transmitter 1 can be attached on top of the receiver 2, for instance by gluing or any other of the methods well known to a person skilled in the art in order to attach two microcircuits on top of each other. Advantageously conductor patterns 16 can be formed on the surface of the receiver 2, whereby the receiver can be connected by bonding wires to these conductor patterns. In such a solution the bonding wires required for the connection of the transmitter do not have to be long. The conductor patterns 16 can be connected by bonding wires either to the connection points 15 of the signal processing circuit 3, or directly to the connection points (not drawn in the figure) of the substrate, The receiver can be fixed on the surface of the signal processing circuit 3 by gluing or by any of the methods well known to a person skilled in the art in order to attach two microcircuits on top of each other.

Above we noted in connection with the description of FIG. 2 that the transmitter 1 can preferably be located in the focus 13' of the optical element 13. However, the invention is not limited to this, but other locations are also conceivable, according to the design of the optical element. The location of the transmitter 1 and the receiver 2 regarding the focus 13' or focal points of the optical element 13 can be solved according to the requirements of the application, so that the entity formed by the optical element 13 and the transmitter 1 and the receiver 2 meets the application's requirements in an optimal way.

Figure 4A:
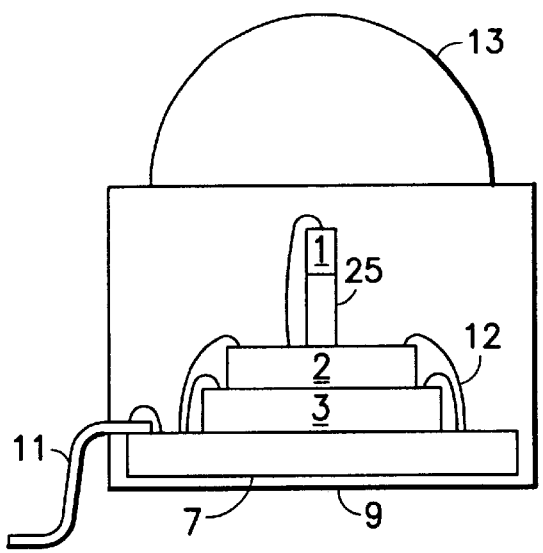
FIG. 4a shows a possible modification of the embodiment in FIG. 2.

FIG. 4a shows an advantageous embodiment of the invention where the transmitter 1 is in front of the receiver 2, in the same way as in The embodiment of FIG. 3, but at a certain distance from it. In an embodiment of this kind the shadow area caused by the transmitter 1 on the surface of the receiver 2 is smaller than The transmitter's 1 bottom area, because the received light can be scattered, refracted or reflected from the different parts of the optical element 13 to the area under the transmitter's bottom. The larger the distance between the transmitter and the receiver, the more optical radiation is received by the receiver 2, because a higher ratio of the rays from the edges of the optical unit 13 can reach also the receiver area which is directly behind the transmitter.

In the embodiment of FIG. 4a the transmitter is mounted on a platform 25, which is made of a material which is transparent at the applied wavelength range.

Figure 4B:
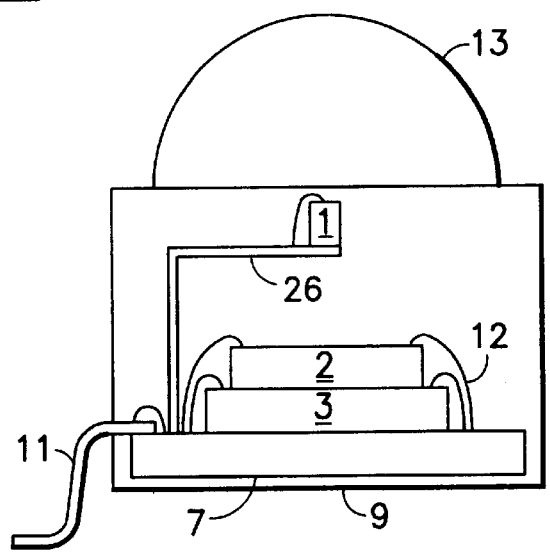
FIG. 4b shows another possible modification of the embodiment in FIG. 2.

FIG. 4b shows another way to mount the transmitter 1 at a certain distance from the receiver 2. In this embodiment the transmitter 1 is mounted on a particular bracket 26. The bracket 26 is preferably so narrow, that it does not substantially shadow the receiver 2. Advantageously the bracket 26 can also be made of optically transparent material, so that it does not shadow the receiver 2.

Figure 5:
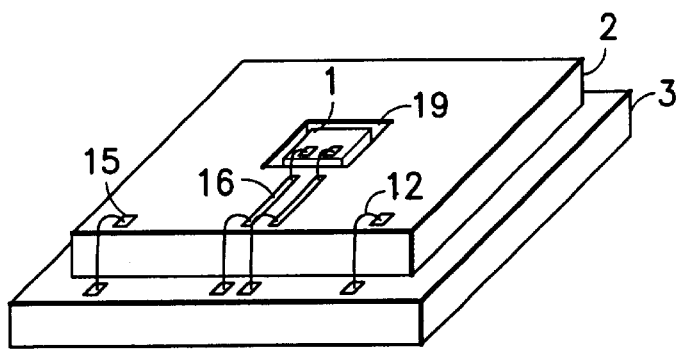
FIG. 5 shows an embodiment of the invention where the transmitter is mounted in a recess in the receiver.

FIG. 5 shows a preferred embodiment of the invention. For the sake of clarity FIG. 5 does not show the module's substrate, casing, pins and lens. In this embodiment the transmitter 1 is mounted in a recess or opening 19 made in the receiver 2.

Depending on the thickness of the receiver 2 and the transmitter 1 the recess 19 can extend through the receiver 2, or it can extend only to a certain depth within the receiver 2. A module according to this embodiment can be made thinner than the module according to the embodiment of FIG. 3. In FIG. 5 the opening or recess 19 has a quadratic form but that is no limitation for different embodiments of the invention. The opening or recess 19 can for instance also be circular, according to the manufacturing method.

Figure 6:
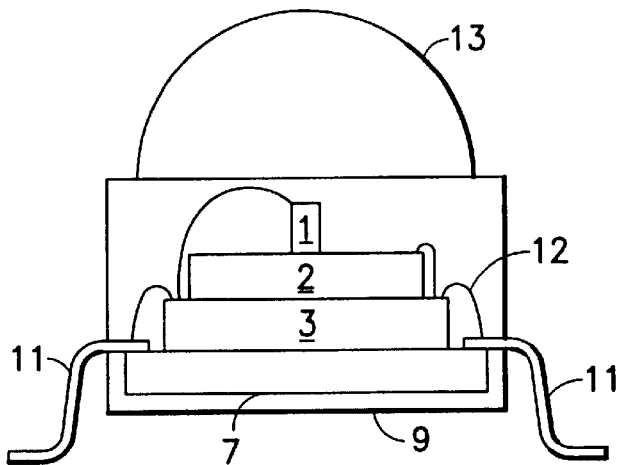
FIG. 6 shows an embodiment of the invention where there is no conductor pattern on the substrate 7.

FIG. 6 shows an advantageous embodiment of the invention. In this embodiment there are no electrically conducting connections on the substrate 7, but the substrate is only a mechanical support means. In this embodiment the transmitter and the receiver are connected to the signal processing circuit 3, which by bonding wires 12 is connected directly to the pins 11.

Figure 7A:
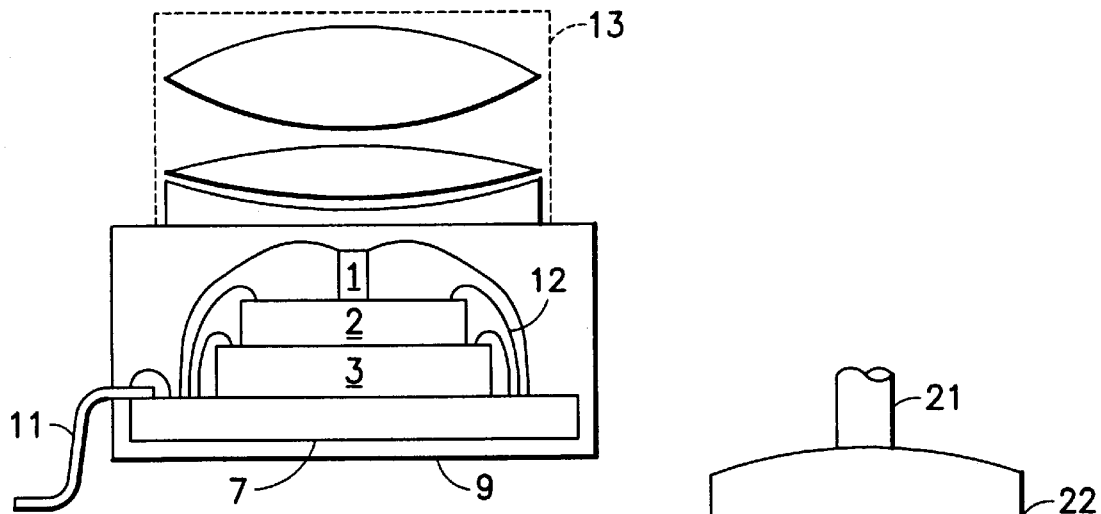
FIG. 7a shows a possible design of the optical unit 13 according to the invention.

FIG. 7a shows an advantageous embodiment of the invention. In this embodiment the optical element 13 is a lens system comprising more than one lens. The lens system can contain both convex and concave lenses, depending on the requirements. An embodiment of this kind is particularly advantageous in such cases where particular requirements, such as accurate directivity, are placed on the optical element. Instead of, or in addition to the conventional lenses in the optical element 13 it is also possible to use any known prior art optical elements, such as different diffractive optical elements (DOE), for instance lenses, grids and mirrors realised by diffractive structures.

Figure 7B:
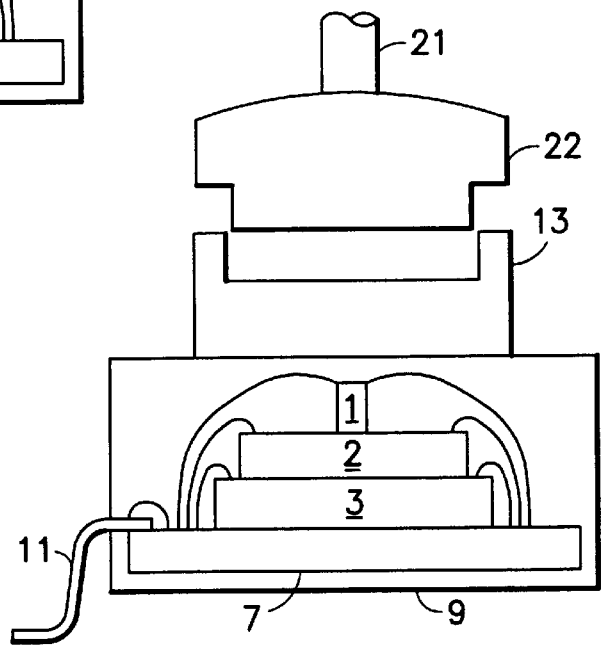
FIG. 7b shows another possible design of the optical unit 13 according to the invention.

FIG. 7b shows an advantageous embodiment of the invention, where the optical element 13 is substantially an optical fibre connector. An optical fibre 21 can be connected to the optical fibre connector 13 by an optical fibre plug 22. With the aid of an embodiment his type the module according to the invention can easily be connected to transmission systems which utilise optical fibres.

Advantageously the module according to the invention can be used in portable mobile stations, as in cellular telephones. In mobile stations the module according to the invention can be used to establish a link for instance between the mobile station and a portable computer, or between the mobile station and a printer. In embodiments of this type the module according to the invention can eliminate the need for separate connecting cables. The module according to the invention can be used for all kinds of data communication between the mobile station and external equipment, such as vehicular holders, whereby the mobile station does not require a separate connector for the data communication. This enhances the operation reliability and the total reliability of the mobile station, because connectors are sensitive components which get dirty and break easily. With the aid of optical data communication the need for mechanical contacts is avoided and a more reliable operation of the system formed by the mobile station and peripherals is obtained.

Figure 8:
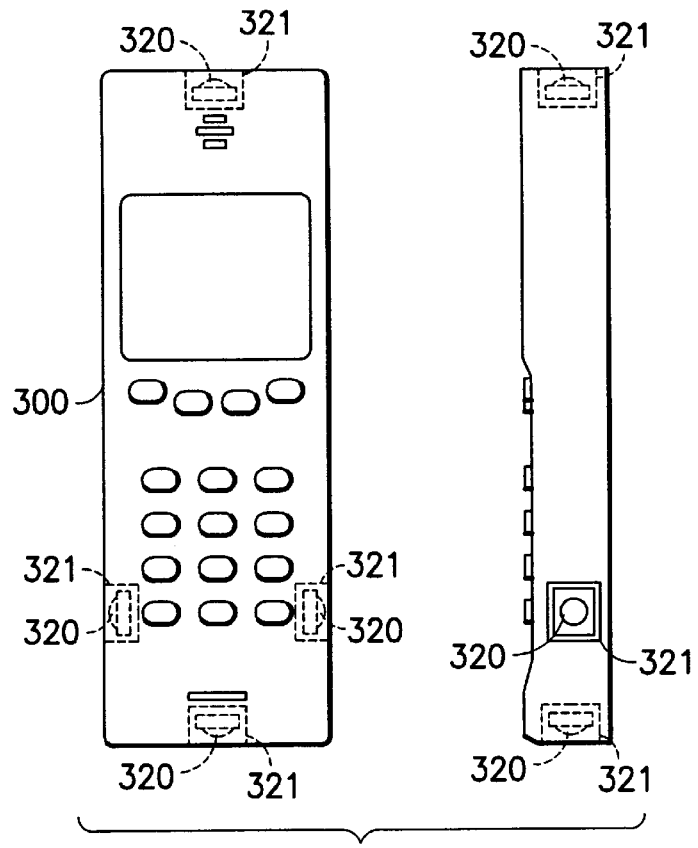
FIG. 8 shows a module according to the invention applied in a mobile station.

FIG. 8 shows some possible locations in a mobile station 300 where a module 320 according to the invention can be mounted. In the embodiment of FIG. 8 a module is mounted in the bottom part of the mobile station, so that the module will detect light coming in a direction from the bottom of the mobile station. The module 320 can for instance be installed in a particular recess 321 so that it does not form a protrusion at the edge of the mobile station, whereby the mobile station's casing will protect the module 320 against blows. Of course the module can also be located in other ways. In addition to the location at the bottom of the mobile station the module can be located at the sides or at the top of the mobile station, for instance in some of the ways shown in FIG. 8. Advantageously also more than one module, for instance two modules 320, can be located in the mobile station, whereby at least one of the modules is not covered by a hand or some part of the mobile station' desktop holder when the mobile station is in its conventional position in the user's hand or for instance in the desktop holder.

Figure 9:
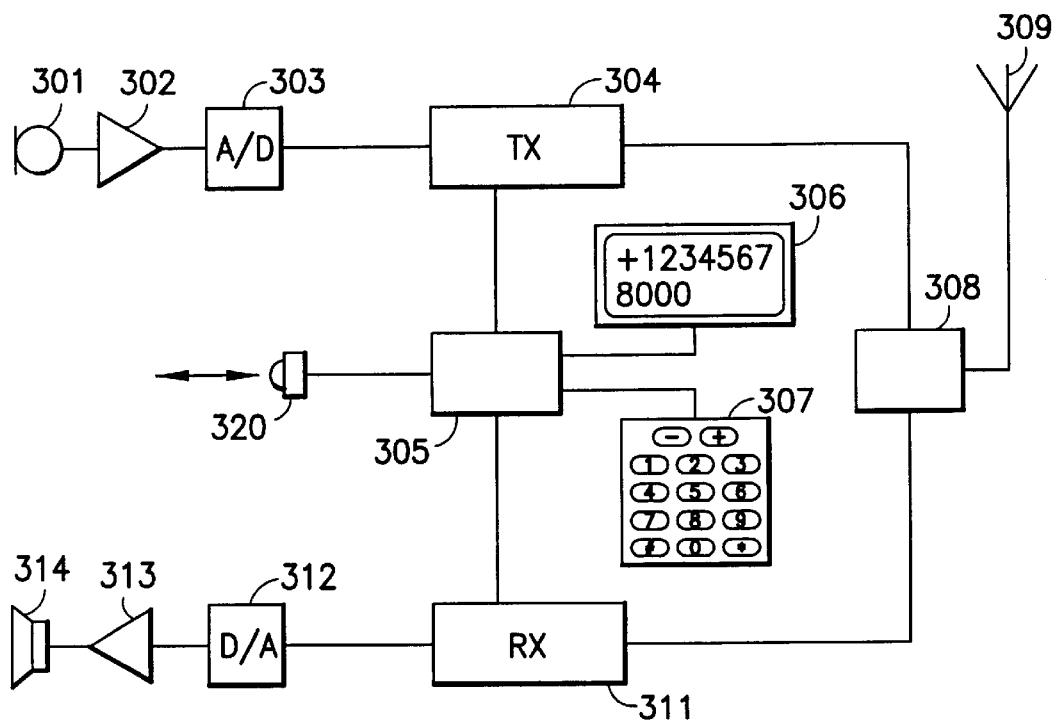
FIG. 9 shows the block diagram of a preferred embodiment of the invention.

FIG. 9 shows in a block diagram a mobile station according to an exemplary embodiment of the invention. The mobile station comprises parts which are typical to a device, such as a microphone 301, a keyboard 307, a display 306, an earphone 314, a transmit/receive switch 308, al antenna 309, and a control unit 305. Further the figure shows the transmitter and receiver blocks 304, 311. The transmitter block 304 comprises the functions required for speech encoding, channel encoding, encryption and modulation as well as the RF functions. The receiver block 311 comprises the corresponding RF functions as well as the functions required for demodulation, decryption, channel decoding and speech decoding. A signal from the microphone 301, amplified in the amplifier stage 302 and converted into a digital form in the A/D converter, is supplied to the transmitter block, typically a speech encoding means in the transmitter block. The emission signal, prepared and modulated and amplified in the transmitter block, is supplied via the transmit/receive switch 308 to the antenna 309. The received signal is supplied from the antenna via the transmit/receive switch 308 to the receiver block 311, which demodulates the received signal and performs the decryption and channel decoding. The speech signal obtained as the result is then supplied via the D/A converter 312 to the amplifier 313 and further to the earphone 314. The control unit 305 controls the functions of the mobile station, reads the instructions given by the user through the keyboard 307, and presents messages to the user via the display 306. The optical transmission module 320 according to the invention is functionally connected to the control unit 305, which receives The signals detected by the module and supplies the signals transmitted to the module. Via the module 320 the control unit 305 can for instance transmit text to be printed on a printer, or receive data from a portable computer via the module 320.

With the solution according to the invention it is possible to realise an optical transmission module which is substantially smaller and handier to use than an optical transmission module according to prior art. Only one lens is required to realise the optical transmission module according to the invention. Further the assembly of the solution according to the invention is simpler and more economic than the assembly of a solution according to prior art.

Instead of the bonding wires 12 it also possible to use other connecting methods known by a person skilled in the art, for instance methods used to realise hybrid circuits.

The module according to the invention can be used for all kinds of optical transmission, but particularly advantageously it can be used for audio signal transmission or data transmission according to the IrDA standard by infrared radiation.

The transmitter 1 can advantageously be a LED. The receiver 2 can advantageously be a PIN diode, but it can also be any other common light sensitive means. The signal processing circuit 3 comprises advantageously at least a preamplifier. However, the signal processing circuit 3 can also contain other functions, such as the protocol control functions required by the IrDA standard.

Even though the invention has been described with reference to the enclosed embodiment, it is obvious that the invention is not limited to these, but that it covers all possible embodiments which can be realised within the inventive idea and the scope of the enclosed claims.

What is claimed is:

1. A small sized optical transmission unit suitable for non-simultaneous transmission and reception comprising a transmitter and a receiver operating in the optical wavelength range, wherein the unit further comprises an optical element, and that both said transmitter and said receiver are arranged to utilise the same said optical element and further in that the transmitter is positioned between the receiver and the optical element.

2. An optical transmission unit according to claim 1, characterised in that said optical element has a certain focus, and that said transmitter is located in said focus of the optical element.

3. An optical transmission unit according to claim 1, characterised in that said receiver is a PIN diode.

4. An optical transmission unit according to claim 1, characterised in that said transmitter is a light emitting diode.

5. An optical transmission unit according to claim 1, characterised in that said transmitter is a semiconductor laser.

6. An optical transmission unit according to claim 1, characterised in that said optical element comprises at least one lens.

7. An optical transmission unit according to claim 1, characterised in that said optical element comprises at least one diffractive optical element.

8. An optical transmission unit according to claim 1, wherein said optical element further comprises a signal processing circuit, whereby the receiver is located between said signal processing circuit and the transmitter.

9. An optical transmission unit according to claim 1, characterised in that the transmitter and the receiver are separated by a certain distance for reducing the effect of shadowing of the receiver by the transmitter.

10. A mobile station, wherein the station comprises an optical transmission unit suitable for non-simultaneous transmission and reception, which optical transmission unit comprises:

a signal processing circuit;

a transmitter and a receiver operating in the optical wavelength range; and an optical element;

whereby the transmitter is between the receiver and the optical element, and whereby both said transmitter and said receiver are arranged to utilise the same said optical element.

11. An optical transmission unit suitable for non-simultaneous transmission and reception, comprising an optical element for collecting optical signals.

a receiver for receiving said optical signals, said receiver being a PIN diode, a transmitter between said receiver and said optical element for transmission of optical signals through said optical element.

* * * * *